(12) United States Patent
Clemo

(10) Patent No.: US 7,475,268 B2
(45) Date of Patent: Jan. 6, 2009

(54) METHOD FOR MANAGING VOLTAGE SUPPLY IN MULTIPLE LINKED SYSTEMS

(75) Inventor: Raymond Mathew Clemo, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/325,718

(22) Filed: Jan. 5, 2006

(65) Prior Publication Data

US 2007/0157038 A1  Jul. 5, 2007

(51) Int. Cl.
  *G06F 11/30* (2006.01)
(52) U.S. Cl. ...................... 713/340; 713/300
(58) Field of Classification Search ................ 713/300, 713/340
  See application file for complete search history.

(56) References Cited

U.S. PATENT DOCUMENTS

| | | | |
|---|---|---|---|
| 5,664,089 A | 9/1997 | Byers et al. | 395/182.12 |
| 6,594,771 B1 | 7/2003 | Koerber et al. | 713/330 |
| 6,788,511 B1 | 9/2004 | Bikulcius et al. | 361/92 |
| 2006/0098368 A1* | 5/2006 | Gentillet et al. | 361/93.1 |

* cited by examiner

*Primary Examiner*—Tse Chen
(74) *Attorney, Agent, or Firm*—Daniel E. McConnell; Cynthia Byrd

(57) ABSTRACT

The present invention discloses a method for managing voltage supply in multiple linked systems. The method may comprise the steps of connecting a plurality of digital data processing elements and a plurality of power supplies into at least two power domains, each of the domains having at least one processing element and at least two power supplies; monitoring a supply of electrical power to the at least two power domains; sensing a drawn current drawn from associated power supplies; sensing a loss of electrical supply to associated power supplies; and responding to a sensed outage of one of said power supplies by switching power supply for a domain in which there is a sensed outage to another domain which has capacity to support the domain with an outage.

1 Claim, 3 Drawing Sheets

METHOD FOR MANAGING VOLTAGE SUPPLY IN MULTIPLE LINKED SYSTEMS

FIELD AND BACKGROUND OF INVENTION

The requirements of data processing systems for electrical power continue to grow, both in new systems being designed and in existing systems in the field. Most of the rising requirement result from increased processor capability and increased power demand by memory. The power requirements will, on occasion, exceed the capability of power supplies associated with processing elements such as systems.

In server applications, this has been handled by providing redundancies. That is, processing elements such as blades in a blade server will be grouped with power supplies into power domains. Each domain will have one or more processing elements such as blades and at least two power supplies associated with the grouped processing elements. The power supplies work together to supply the voltages and currents required by the processing elements.

Systems with such N+1 or N+N power supply schemes are known. However, if one power supply shuts down, as by loss or electrical supply or failure, then the system may fail. Some newer processing elements address such problems by providing for throttling down, also sometimes known as power fold back. This is helpful in reducing the power requirement of a domain to that which can be supplied by a single supply, but takes time. There can be sufficient time if line power is lost, as most power supplies typically have a hold up interval. However, if one supply fails, there may be no holdup time available and so over current protection may be tripped in remaining power supplies.

SUMMARY OF THE INVENTION

With the foregoing in mind, it is one purpose of the present invention to provide power supply protection for a data processing system having elements grouped into a plurality of power domains, each one of which has at least one processing element and at least two power supplies. In realizing this purpose, power domains are interconnnected by sensing and switching circuitry, which senses the conditions of power supply and demand in and among the domains and switches from one domain to power supplies in another domain in the event of failure in the first domain. In particular, a method is disclosed that may comprise the steps of connecting a plurality of digital data processing elements and a plurality of power supplies into at least two power domains, each of the domains having at least one processing element and at least two power supplies; monitoring a supply of electrical power to the at least two power domains; sensing a drawn current drawn from associated power supplies; sensing a loss of electrical supply to associated power supplies; and responding to a sensed outage of one of said power supplies by switching power supply for a domain in which there is a sensed outage to another domain which has capacity to support the domain with an outage.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
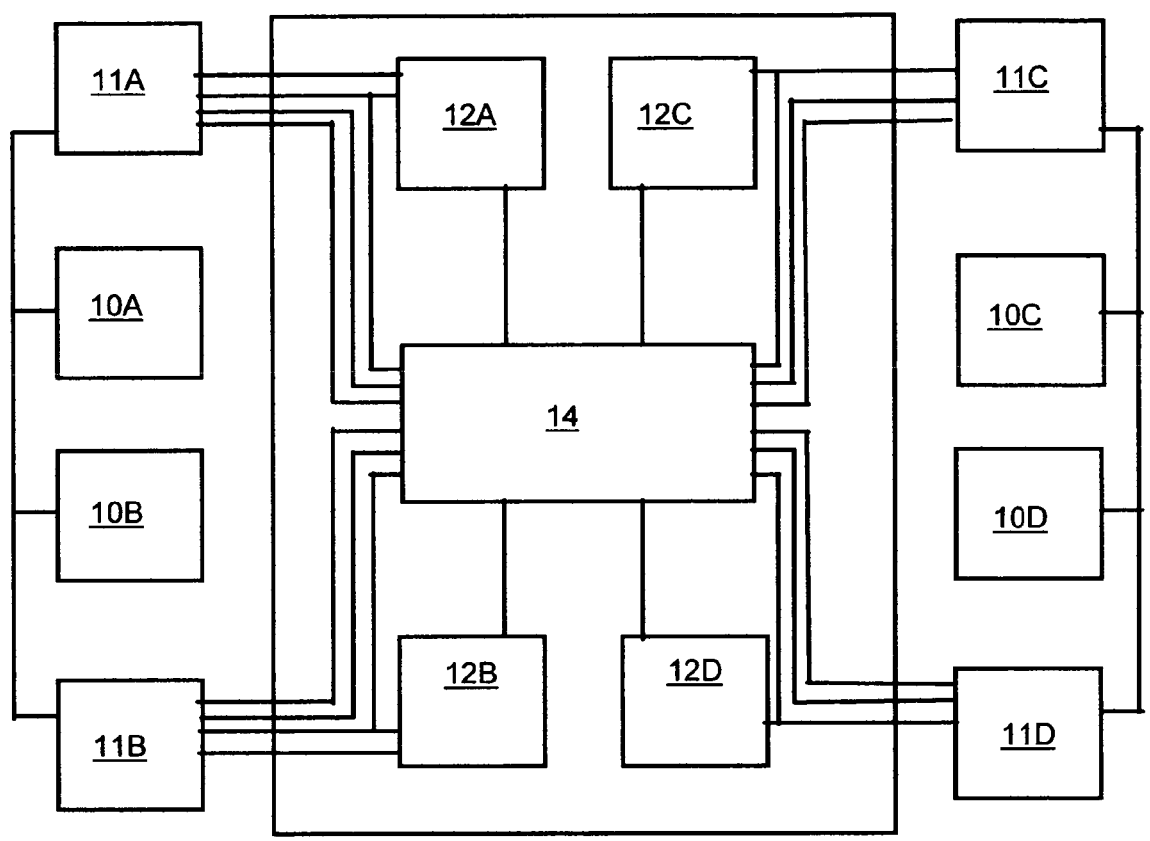
FIG. 1 is a schematic representation of connections among a plurality of processing systems, a plurality of power supplies, and circuitry in accordance with this invention which controls sharing of power supply resources among the systems.
Figure 2:
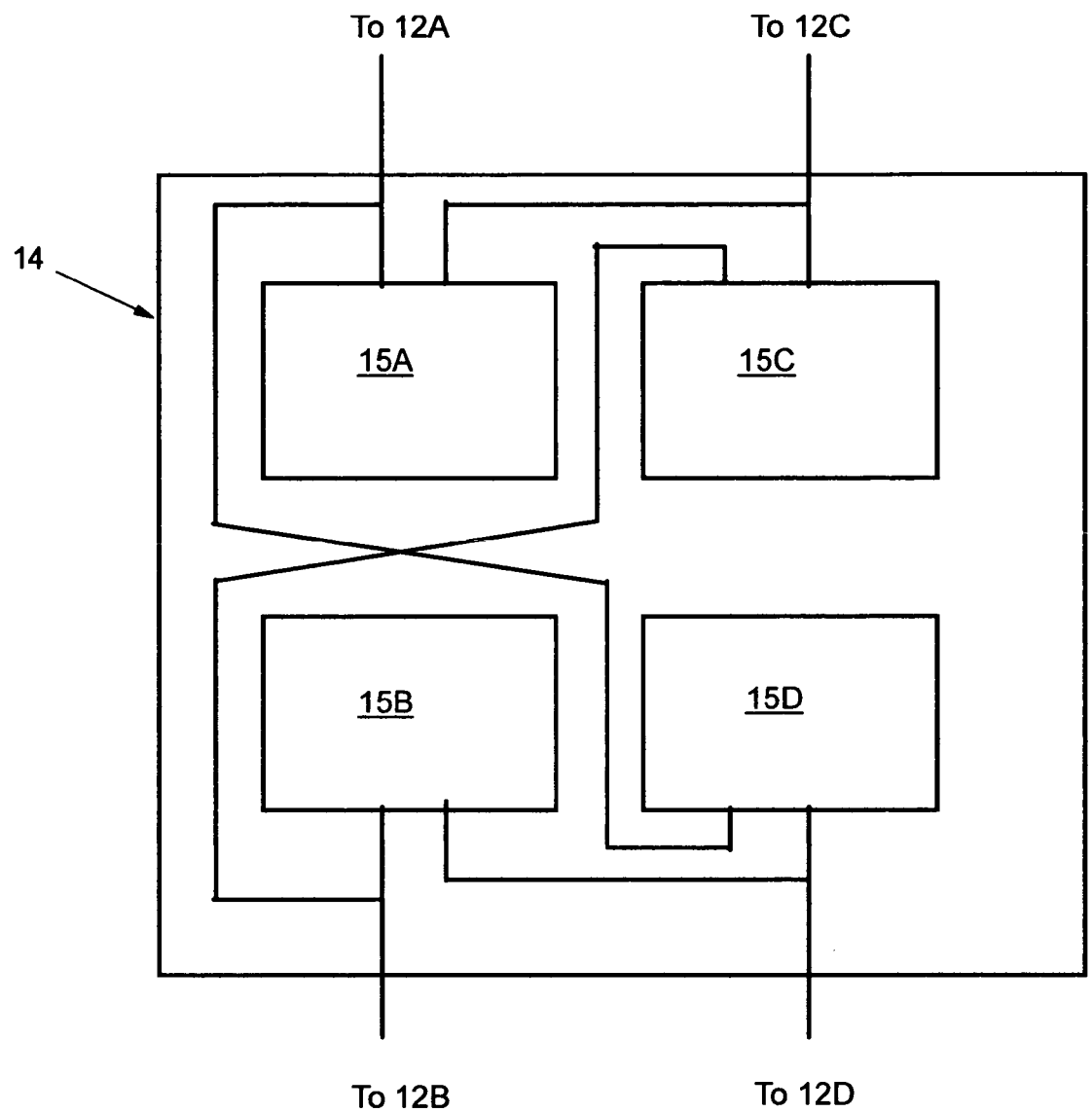
FIG. 2 is a schematic representation of switching circuitry forming a portion of this invention.

Referring now more particularly to the accompanying drawings, FIG. 1 shows schematically a plurality of digital data processing elements 10A, 10B 10C, 10D. The elements 10A through 10D may be blades within a server blade assembly or other devices which have printed circuit boards carrying an array of semiconductor devices which handle digital data. The elements may be server computer systems or telecommunications control systems or other known digital data processing systems. While only four such elements are illustrated, it will be understood that in a normal installation there can be many more elements, and the illustration of only four has been chosen only for the purpose of simplifying the drawing.

The apparatus also includes a plurality of power supplies 11A, 11B, 11C, 11D. The power supplies and processing elements are interconnected into a plurality of power domains, indicated at 12A, 12B, 12C and 12D. Again, while only a few power supplies and domains are illustrated, that limitation is solely for the purpose of clarity in simplifying the drawing and a implementations usually will include such numbers of processing elements, power supplies and power domains as are determined by system architects and designers.

In accordance with important features of this invention, the domains 12A, 12B, 12C, 12D are operatively connected with sensing and switching circuitry 14 which senses the conditions of power supply from the power supplies to the processing elements and responds to a sensed outage of one of the power supplies by switching power supply for a domain in which there is a sensed outage to a domain which has capacity to support the domain with an outage. The switching circuitry is shown in greater detail in FIGS. 2 through 5.

The switching circuitry monitors several characteristics of the power supplied to the domains from the power supplies with which it is associated. Providing power from one domain to another requires careful consideration to ensure that the second domain avoids failure due to excessive demand, which could cause the loss of operability for an entire complex of systems. The domain to become a source must not be overloaded. The load imposed by the domain to be supported must be shared between or among the plurality power supplies in the newly designated source domain. The power made available to the receiving or load domain should be held to a level which just avoids overloading of any remaining active power supply in that domain, for purposes of overall protection of the complex being supported. The power made available to the receiving or load domain can be held at a full requirement until either the failing power supply has been removed or the load is safely throttled back to reduce the power demand in that domain, depending upon the design capability.

As here illustrated, the switching circuitry 14 monitors the voltage being supplied in the domains (here identified as $V_{rem}$); the current being drawn from the domains (here identified as $I_{share}$); and a logic level signal which is activated when the loss of line supply is detected (here identified as EPOW for Emergency Power Off Warning). The following describes circuitry using limited power supply signaling. Signals and circuitry could be added to the power supply which could reduce component count of and/or enhance the described circuits. For $V_{rem}$ and $I_{share}$, there is one sensed value for each domain; for EPOW, one for each power supply. Conductors through which monitor signals pass are shown in FIG. 1, and are omitted for clarity in FIG. 2. However, the passage of those signals through the gates of the logic circuitry to be described below are indicated in FIGS. 3, 4 and 5.

The switch logic uses signals from the domains and power supplies to determine which supplies should be interconnected. The switches themselves (FIG. 2) use an array of switch circuits 15A, 15B, 15C, 15D interposed between the power supplies and the domains supported so as to direct loads to varying combinations of power supplies depending upon sensed needs. Current supplied from each domain is sensed as an analog voltage proportional to the power supply output current and provided through gates for comparison to a reference voltage ($V_{ref}$) which is set to a desired threshold indicative that a single power supply is supporting the entire load of a domain.

Figure 3:
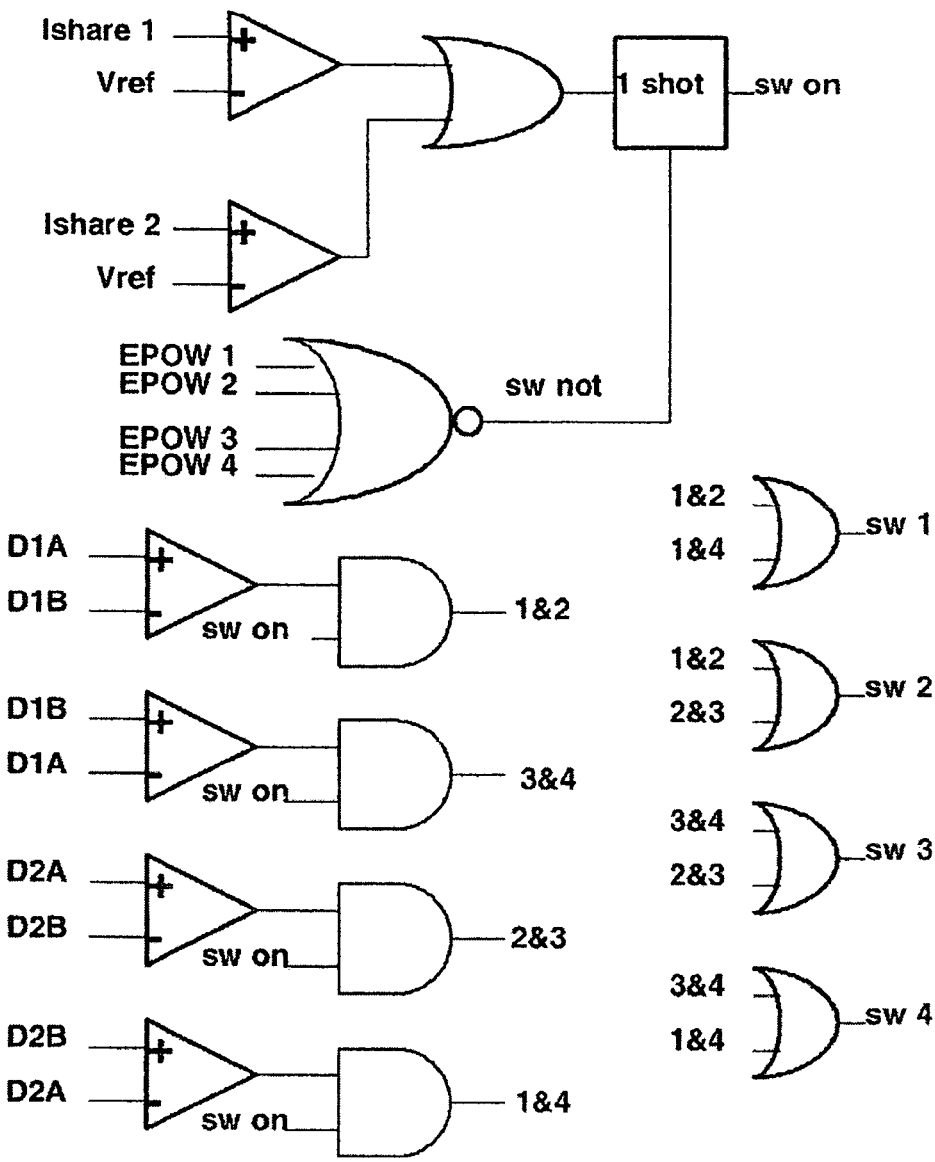
FIGS. 3, 4 and 5 are detailed views of elements of the circuitry of FIG. 2.
Figure 4:
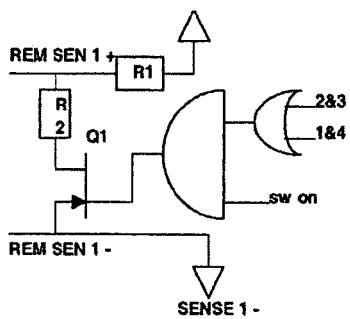
Figure 5:
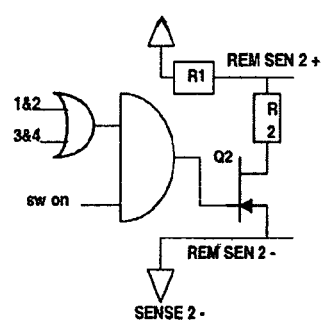

The logic controlling the switches is shown more specifically in FIGS. 3, 4 and 5. The elements of the switch logic are not there shown directly interconnected. However, the signal lines are identified by letters corresponding to the description here. The switch logic of FIG. 3 is present in each of the switches 15A, 15B, 15C and 15D of FIG. 2. The voltages of the domains are identified as D1A for domain 12A; D1B for domain 12B; D2A for domain 12C; and D2B for domain 12D. $I_{share}1$ and $I_{share}2$ are analog signals, used by the power supplies 11A, 11B, 11C, and 11D to allow current sharing among them. The voltage on the $I_{share}$ lines is proportional to the power supply output current. $I_{share}1$ is shared by domains 12A and 12B; $I_{share}2$, by domains 12C and 12D. $V_{ref}$ is a reference voltage with which to compare the $I_{share}$ signals. It should be set to a desired threshold which indicates that a single power supply is unable to support the entire load of a domain. EPOW 1 through EPOW 4 are derived respectively from power supplies 11A through 11D and are activated when loss of input line power is sensed. Power supplies are generally required to hold output up for some milliseconds after loss of mains power and assertion of EPOW. Signals indicated simply at 1, 2, 3 and 4 are logic signals indicating which switches 15A, 15B, 15C, 15D are to be turned on. SW1 through SW4 are the signals which turn the switches on.

D1A, D1B, D2A and D2B are compared to determine when and which switches need to be turned on for power sharing. $I_{share}1$ and $I_{share}2$ are compared against $V_{ref}$. If an $I_{share}$ signal is greater than $V_{ref}$, then a one shot circuit is triggered. The duration of the one shot pulse is determined by the time needed to throttle down the load imposed by the systems to which power is falling. The EPOW signals are or-ed together and prevent the one shot from triggering, because there is a power supply output hold up time associated with EPOW.

During the time that the one shot is triggered, the transistors $Q_1$ and $Q_2$ (FIGS. 4 and 5) will be turned on to raise the voltage in what will be the source domain by the ratio of $R_1$ to $R_2$.

The switches may be JFETs, two MOSFETS in series such that their body diodes oppose, or any other circuit which, when turned on, will allow current to flow in either direction.

In the drawings and specifications there has been set forth a preferred embodiment of the invention and, although specific terms are used, the description thus given uses terminology in a generic and descriptive sense only and not for purposes of limitation.

What is claimed is:

1. Method comprising:
    connecting a plurality of digital data processing elements and a plurality of power supplies into at least two power domains, each of said domains having at least one processing element and at least two power supplies;
    monitoring a supply of electrical power to the at least two power domains;
    sensing a drawn current drawn from associated power supplies;
    sensing a loss of electrical supply to associated power supplies; and
    responding to a sensed outage of one of said power supplies by switching power supply for a domain in which there is a sensed outage to another domain which has capacity to support the domain with an outage;
    said responding to a sensed outage comprises determining a capability of interconnected power supplies to supply a required current by associated processing elements supplied by a power supply which has lost electrical supply and, in the event that the interconnected power supplies are incapable of continuing current supply, limiting the interval of time during which current is supplied to said associated processing elements supplied by the power supply which has lost electrical supply.

* * * * *